US008825042B2

(12) United States Patent
McCarthy et al.

(10) Patent No.: US 8,825,042 B2
(45) Date of Patent: Sep. 2, 2014

(54) NETWORK DIAGNOSTIC SYSTEM FOR ANALYZING THE PERFORMANCE OF A RADIO NETWORK DURING FUNCTIONAL OVER-THE-AIR OPERATION

(75) Inventors: John McCarthy, Palm Bay, FL (US); Robert Mitchell, Orlando, FL (US)

(73) Assignee: Lows Location Systems, LLC, West Melbourne, FL (US)

( * ) Notice: Subject to any disclaimer, the term of this patent is extended or adjusted under 35 U.S.C. 154(b) by 0 days.

(21) Appl. No.: 13/106,833

(22) Filed: May 12, 2011

(65) Prior Publication Data

US 2012/0289242 A1    Nov. 15, 2012

(51) Int. Cl.
*H04W 24/00*    (2009.01)

(52) U.S. Cl.
USPC ......... 455/423; 370/247; 455/446; 455/67.11

(58) Field of Classification Search
USPC ................. 455/423–425, 446, 67.11; 370/241–253; 340/853.2
See application file for complete search history.

(56) References Cited

U.S. PATENT DOCUMENTS

| | | | |
|---|---|---|---|
| 4,554,410 A | | 11/1985 | Furumoto et al. |
| 5,973,643 A | * | 10/1999 | Hawkes et al. ............. 342/457 |
| 5,987,306 A | | 11/1999 | Nilsen et al. |
| 6,308,065 B1 | * | 10/2001 | Molinari et al. ............. 455/424 |
| 6,671,291 B1 | * | 12/2003 | Soliman ...................... 370/503 |
| 6,745,011 B1 | | 6/2004 | Hendrickson et al. |
| 6,873,601 B1 | | 3/2005 | Chow |
| 6,965,769 B2 | | 11/2005 | Bims et al. |
| 7,346,346 B2 | | 3/2008 | Lipsit |
| 7,881,206 B2 | | 2/2011 | St. Pierre et al. |
| 7,913,182 B2 | | 3/2011 | Bear et al. |
| 8,000,700 B2 | | 8/2011 | Choi et al. |
| 2002/0009992 A1 | * | 1/2002 | Jensen ......................... 455/422 |
| 2002/0072359 A1 | | 6/2002 | Moles et al. |
| 2003/0061340 A1 | | 3/2003 | Sun |
| 2004/0032836 A1 | * | 2/2004 | Grilli et al. .................. 370/252 |
| 2004/0142699 A1 | | 7/2004 | Jollota et al. |
| 2004/0203489 A1 | | 10/2004 | Comerford et al. |
| 2006/0003776 A1 | | 1/2006 | Natori et al. |
| 2006/0030270 A1 | | 2/2006 | Cheng |
| 2006/0141998 A1 | * | 6/2006 | Kennedy et al. .............. 455/423 |
| 2006/0205398 A1 | * | 9/2006 | Seckendorf et al. .......... 455/423 |
| 2007/0178843 A1 | | 8/2007 | Singh et al. |
| 2008/0095131 A1 | | 4/2008 | Aljadeff et al. |

(Continued)

OTHER PUBLICATIONS

Written opinion of the International Searching Authority; mailing date Aug. 3, 2012 for International Application No. PCT/US 12/37037.

*Primary Examiner* — Daniel Lai
(74) *Attorney, Agent, or Firm* — Mayback & Hoffman, P.A.; Gregory L. Mayback

(57) ABSTRACT

An apparatus for determining network health, the network comprising a plurality of network base station transceivers in bidirectional communication with radios operating in the network, a first radio transmitting a transmitted signal. The apparatus comprises first and second devices for determining respective first and second signal parameters of respective first and second received signals, the first and second received signals responsive to the transmitted signal transmitted during normal over-the-air operation of the first radio, wherein the received signal received at the first receiver is time aligned with the received signal received at the second receiver to ensure the first and second devices determine the first and second signal parameters of the same transmitted signal and wherein the network health is responsive to the first and second signal parameters.

22 Claims, 2 Drawing Sheets

(56) References Cited

U.S. PATENT DOCUMENTS

| | | |
|---|---|---|
| 2008/0113623 A1 | 5/2008 | Gormley |
| 2008/0201109 A1* | 8/2008 | Zill et al. .................. 702/186 |
| 2009/0052330 A1 | 2/2009 | Matsunaga et al. |
| 2009/0082009 A1 | 3/2009 | Nagy |
| 2009/0098867 A1 | 4/2009 | Varanda |
| 2009/0098868 A1 | 4/2009 | Cheng |
| 2009/0310501 A1* | 12/2009 | Catovic et al. ............. 370/252 |
| 2010/0020717 A1 | 1/2010 | McGregor |
| 2010/0197299 A1 | 8/2010 | Huber et al. |
| 2010/0254267 A1 | 10/2010 | Blackwell |
| 2010/0259448 A1 | 10/2010 | Qahwash et al. |
| 2011/0090807 A1 | 4/2011 | Caudill |

* cited by examiner

| Base Station 5 | | Location 6 | |
|---|---|---|---|
| | | Parameter measured | Base Station |
| | | -4 dBm | 3 |
| | | -8 dBm | 4 |
| | | -1 dBm | 5 |

| | Base Station 4 | |
|---|---|---|

| Base Station 3 | | Location 1 | |
|---|---|---|---|
| | | Parameter measured | Base Station |
| | | -7 dBm | 3 |
| | | -8 dBm | 4 |
| | | -0.5 dBm | 5 |

Figure 2

NETWORK DIAGNOSTIC SYSTEM FOR ANALYZING THE PERFORMANCE OF A RADIO NETWORK DURING FUNCTIONAL OVER-THE-AIR OPERATION

BACKGROUND OF THE INVENTION

The ability of a communications network comprising a plurality of transceivers (referred to as radios in some networks) to operate according to its specifications is crucial to proper communications between the network radios. Sometimes a network user or operator does not realize the network is not operating according to its specifications until it fails completely. Network failure may be due to the improper operation of one or more radios within the system, one or more network base stations, or interference encountered by network signals. The faulty radio or base station must be taken out of service, the cause of the failure diagnosed and the radio or base station repaired. The present invention overcomes this limitation by advising the network users when a network specification parameter is not met, albeit network performance is degraded and the network has not failed completely.

BRIEF DESCRIPTION OF THE FIGURES

The present invention can be more easily understood and the advantages and uses thereof more readily apparent when the following detailed description of the present invention is read in conjunction with the figures wherein:

FIG. 2 illustrates a network map based on the signal parameters determined with respect to FIG. 1.

In accordance with common practice, the various described features are not drawn to scale, but are drawn to emphasize specific features relevant to the invention. Like reference characters denote like elements throughout the figures and text.

DETAILED DESCRIPTION OF THE INVENTION

Figure 1:
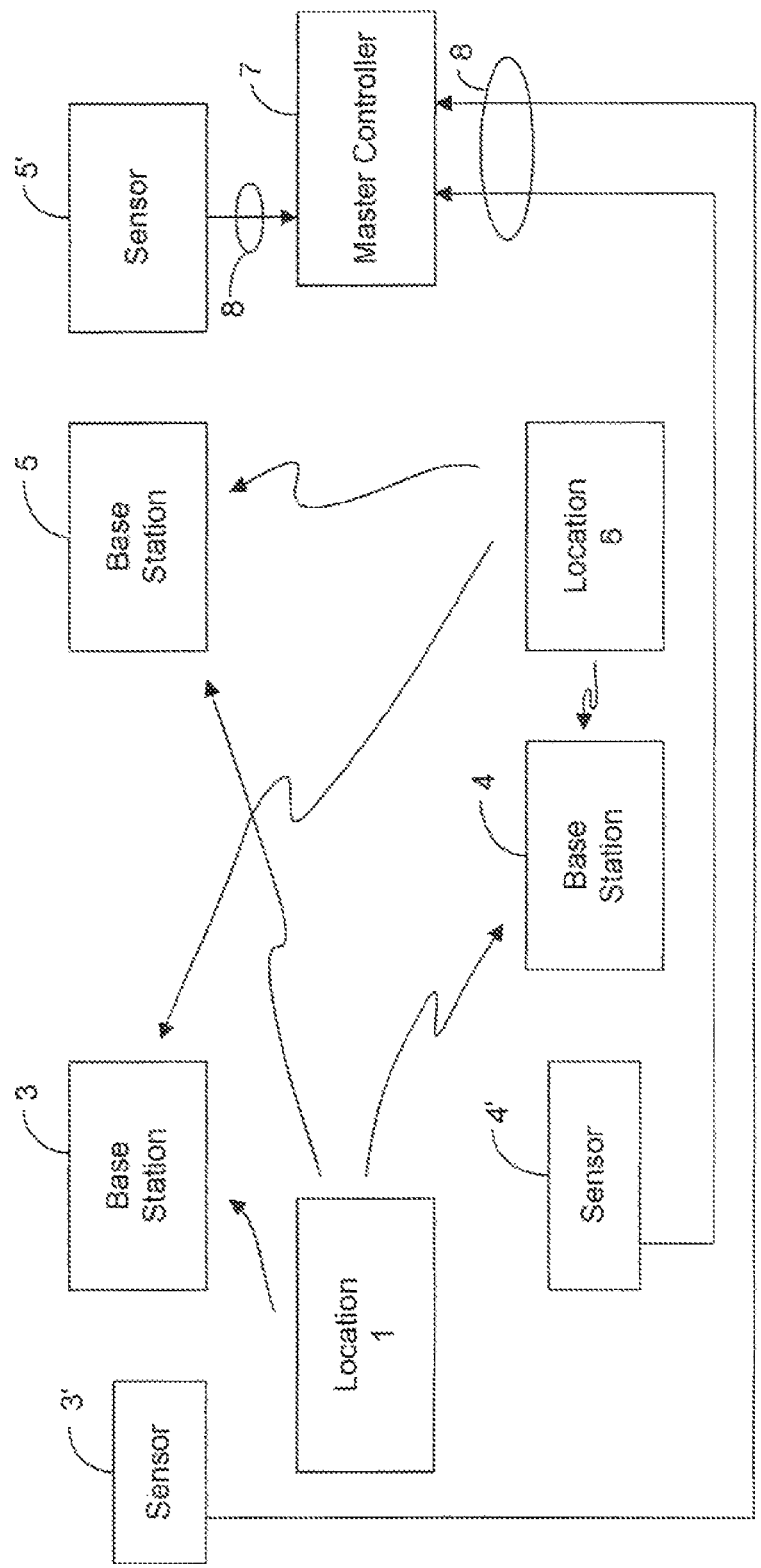
FIG. 1 illustrates a network illustrating one embodiment of the present invention.

Before describing in detail a diagnostic system for analyzing performance of a radio network during over-the-air operation, according to the present invention, it should be observed that the present invention resides in a novel and non-obvious combination of structural elements and method steps. Accordingly, these elements have been represented by conventional elements and steps in the drawings and specification. The elements and process steps conventionally known in the art are described in lesser detail, and elements and steps pertinent to understanding the invention are described in greater detail. The following preferred embodiments are an application of the present invention and are not intended to define limits of the structure or use of the invention, but only to provide exemplary constructions. Many variations can be made to the described diagnostic system within the scope of the presented claims.

As used herein the term "radio" refers to any transceiver (or a transmitter or a receiver) transmitting or transmitting and receiving RF signals. Mobile and portable transceivers used in public safety trunked networks are commonly referred to as radios. As used herein, the term "radio network" refers to a communications network comprising such radios. The radios may comprise mobile, portable or stationary transceivers operating in a network environment, with each radio transmitting a radio frequency signal for receiving by another radio within the network via a network base station.

The present invention, commercially referred to as a DiagnostX System, determines the "health" of a radio network by measuring multiple radio operating parameters at a plurality of locations in a network coverage area. The network "health" is determined from these measured parameters. The "health" may be deemed good if at most locations within the network the measured parameters are within a specified range. The "health" may be deemed poor if the measured parameters are beyond a desired range for many or most locations within the network or if a receiver or transmitter is outside a boundary.

Several network-related components may degrade network performance, e.g., base station equipment failures, antenna cable breakdown. Also, a radio exhibiting poor "health" may cause degradation of the network. In this case the network is degraded by the inability of a poor "health" radio to communicate with other network radios. Thus, according to the present invention, only known good radios are used to determine network health.

Beyond the use of good radios to determine network health, radios that are authorized and/or unauthorized to use the network can also be used to determine network health. A radio that is not authorized to use the network (for example, a clone of an authorized radio) degrades the capacity of the network and, at least tangentially, the health of the network.

By first identifying signal parameters that determine radio health, a DNA (DiagnostX Network Anomaly) can be used to later identify unauthorized radios on the network. For example, by determining that two or more radio transmissions using the same radio identification did not originate from the same radio (because the determined signal parameters do not match) is typically evidence of a DNA, i.e., an unauthorized radio on the network. These DNA radios are not used to determine other factors of network health. Thus, only non-DNA signals are used to determine network health.

The network may include, but is not limited to, a WiFi network, a trunked radio network, a cellular telephone network, a paging network, a WiMax network, an 802.11x network and a Zigbee network. The teachings of the invention can be applied to radios operating in digital and analog networks (where the analog networks include such devices as conventional two-way radios and AM or FM transmitters).

By determining the "health" of the network, the system can identify incipient and real-time network problems and prompt the initiation of necessary repairs. This reduces network downtime and improves network "health" after successful completion of the repair. A "healthy" network ensures improved performance for radios operating in the network. Further, when radios operating in the network are located using the signals they transmit, a "healthy" network improves location accuracy.

The invention determines the network health diagnoses using normal over-the-air signals in real-time as the signal is received and network operating parameters are collected. Alternatively, the operating parameters can be stored for later analysis and diagnosis. Any over-the-air signal transmitted during normal operation of the radio is sufficient to diagnose network health. No special test period or test signal is required. Since the "health" of the network is determined during over-the-air operation, prior art bench tests are not required. The present invention does not require removing the radio from active service to evaluate network "health."

The diagnostic system of the invention extracts the necessary operating parameters (from which the network health can be determined) for any signal protocol, waveform and format and also for an encrypted and unencrypted signal.

However, the diagnostic system must know, in advance, the signal protocol and format to determine whether the transmitted radio signal complies with that signal protocol and format.

The "health" of the network is related to the "health" of each radio within the network. When network communications involve a base station, the network "health" is also influenced by the mechanical, physical and electronic properties of the base station (e.g., a bad cable, connector or antenna). Further, the network "health" is influenced by propagation paths from the radio to the base station with which it communicates. Network "health" is important to ensure that a radio user can effectively communicate with others in the network.

When used in the present application, the network "health" refers to performance in accordance with applicable performance specifications as determined by the radio manufacturer, system architecture or as determined by the user or network operator. That is, the network operator may require tighter tolerances for certain operational parameters due to the characteristics of its network. An analysis of the health of the network is, to a degree, dependent on the health of the radios that comprise the network.

One application of the present invention applies to radios operating in a trunked radio system that includes a location-determining subsystem for determining the location of any transmitting radio. In this application the network health is important to accurately locate the radio and thus its operator.

A network may comprise a plurality of base stations and a plurality of mobile radios that each send signals to and receive signals from the base station. Upon reaching the base station, the signals are typically relayed to another mobile radio in the network. As the radios move around the network each radio is in contact with a different base station for communicating with other radios in the network.

In one example of the present invention, signal receivers (also referred to as sensors) are disposed proximate to each network base station. Each receiver receives and analyzes a signal transmitted from a radio within the coverage area of the base station with which the receiver is associated (albeit the radio is likely moving around the network coverage area). The network health can then be determined from these signal parameters.

A location of the sending radio, although not required to determine network health, can be approximately known or can be approximately determined, for example, by using a triangulation technique or by reference to one or more signal parameters (especially a power-related parameter) and the variation of those parameters as they are measured at each receiver, i.e., at each base station. The measured signal parameters from a signal transmitted by a given radio can be compared with the signal parameters from signals transmitted from other radios to determine an approximate location of the given radio or that the radio is closer to one base station than it is to another base station. For example, if the signal strength is higher at base station A than at base station B for a given signal, then it can be deduced that the transmitting radio is closer to base station A than base station B. But if the SNR is poor at base station A but marginal at base station B, then there may be noise or interference along the signal path from the radio to base station A. From such signal parameters and by comparing and contrasting signal parameters, a map of the received signal parameters in the base station coverage area can be created. The map indicates the signal parameters for the same signal as it is received at each network base station.

See FIG. 1. For example, assume a radio is transmitting from a location 1 of a network comprising base stations 3, 4 and 5. The signal is received at base stations 3, 4 and 5 and the desired signal parameters are determined at the base stations 3, 4, and 5. Similarly, a signal transmitted from a radio at a location 6 is also received at the base stations 3, 4 and 5 and the parameters of the received signal measured at each base station 3, 4 and 5.

FIG. 2 is a map of the information described with respect to FIG. 1. At map location 1, the received signal parameters as determined at each base station 3, 4, and 5 (or the receiver associated with each base station 3, 4 and 5) are indicated. At the map location 6, the signal parameters as the signal is received at the base stations 3, 4 and 5 (or at the receiver associated with each of the base stations 3, 4 and 5) are indicated. Thus the map of FIG. 2 provides an indication of the network performance (i.e., as the signal is received at the base stations 3, 4 and 5) for locations 1 and 6 in the network coverage area. However, as described above, it is not necessary to know the location of the transmitting radio as the map can be created without this information.

By locating a receiver at each network base station and using multiple radio transmissions from different locations in the network coverage area, a signal parameter map can be determined for the network. The map may indicate, for example, that for a radio transmitting from location 1, the signal parameter as measured at base station 5 is inexplicably low. But the same signal parameter as measured at the other base stations 3 and 4 is within the expected parameter range. Since the other base stations measure an acceptable operating parameter, the data suggests a problem at base station 5 or on the path from location 1 to base station 5. An operational problem with the transmitting radio is ruled out as base stations 3 and 4 measure acceptable parameter values.

The network performance should be determined by receiving and measuring signals from known-good radios. A radio exhibiting poor health cannot be used to determine the network health, as it is difficult to differentiate between a poor heath radio and a poor health network. Techniques for determining whether a radio is characterized as a "good health" radio are set forth in co-pending and co-owned applications: (1) the application filed on Sep. 14, 2010, assigned application Ser. No. 12/882,193 and entitled Method and System for Analyzing Radio Performance During Over-the-Air Operation and (2) the application filed on May 12, 2011 and assigned application Ser. No. 13/106,812 and entitled Method and System for Diagnosing Radio Performance During Functional Over-the-Air Operation.

To determine the network health, it is necessary for each receiver to analyze the same signal. This is accomplished by time aligning the signals received at the different receivers where all the received signals represent the same emission from the same transmitting radio. There several schemes that can be used to time align the signals as received at each receiver. For example, a one pulse per second timing signal may be available within the network and can be used to check the time alignment of the received signals. A time alignment technique is required to ensure that the SNR, for example, of the same signal is measured at each receiver and thereafter displayed on the network map.

The network diagnostic system of the present invention, in addition to the network receivers, comprises at least one master controller receiving signal information over a backhaul link from all receivers in the network. See FIG. 1, illustrating sensors 3', 4' and 5' collocated with respective base stations 3, 4 and 5, a master controller 7 (also referred to as a DiagnostX analyzer), and a backhaul link 8 between the master controller 7 and each sensor 3', 4' and 5'.

Each receiver receives the signal and sends signal-related information to the master controller 7. The master controller analyzes the signal information to determine signal parameters for the signal received at each receiver. By receiving and analyzing the signal parameters from all network receivers, the master controller can create a network map from which the network health, and in particular the network health at many different locations within the network, can be determined.

Alternatively, each sensor 3', 4', and 5' not only receives the signal but also performs the necessary analysis to determine the signal parameters from which the network health can be determined and displayed as described above. In this embodiment the determined signal parameters are sent to the master controller 7 over the backhaul link 8 for creating the network map depicted in FIG. 2.

The radio network may be degraded by many different circumstances. For example, an impediment along the RF receive path to a network base station/collocated receiver (e.g., an interfering structure reflecting RF signals away from a base station antenna or a proximate transmitter having a frequency spectrum that overlaps with the frequency spectrum of a radio transmission) may degrade network performance. Or a faulty component within the receiving base station (e.g., a degraded cable from the receiving antenna to the base station receiver front end) may degrade network performance and/or cause network parameters to vary from the specification values. A significant degradation or a significant variation from the specification may prevent a single radio or multiple radios within the network from communicating with the affected base station and thus from communicating with other radios within the network.

The network diagnostic system of the present invention may incorporate packet sniffing technology to determine that a radio is compliant with the applicable packet/signal specification and interoperability between systems operated by different network providers, e.g., as used by different government agencies, government departments or private users. For each transmission captured by the diagnostic systems, a representation of the protocol is presented, providing the user with information to determine whether each radio complies with its applicable protocol specification.

The ability of the diagnostic systems to determine whether a radio transmission embodies the correct packet structure also assists in identifying radios that may be the cause of network interoperability issues that degrade the health of one or both of the interoperating networks. The determination that a transmitted packet structure is correct ensures that any perceived network issues can be tracked to network problems and not to individual radio problems.

The network health diagnostic system may incorporate one or more different location methods to determine the location of a radio for use in determining network health. Knowing the location aids in determining the validity of data from multiple sensors as well as providing geographic association between the collected radio data and its location. Geographic location and radio health measurements assist the network provider and maintenance personnel in support of an optimally performing network and radios, while minimizing troubleshooting, guesswork and maintenance downtime.

Location methods that may be used in determining geographic location may include but are not be limited to;
  Global Positioning System (GPS)
  Assisted GPS (AGPS)
  Cellular ID (CID)
  Enhanced-cellular ID (E CID)
  Timing Advance (TA)
  Timing advance with network measurement reporting (TANMR)
  Site ID (SID)
  Enhanced observed time difference (E-OTD)
  Time of arrival (TOA)
  Time difference of arrival (TDOA)
  Angle of arrival (AOA)
  RF pattern matching (location fingerprinting)
  Differential RSSI
  Known static location For example, the location can be determined by performing a time of arrival measurement at each receiver then calculating the location at the master controller 7 of FIG. 1. Alternatively, each radio may contain its location (as determined by a GPS technique) in each transmission or the location information may transmitted on an alternative channel. The location information may be stored in a database.

Utilizing functional over-the-air performance measurements of only the "good" radios (which requires analysis of radio performance and the determination of "good" radios prior to analysis of network performance) and associating radio locations with uplink signal parameter measurements as received by one or more receivers allows the determination of network health from the perspective of the network base stations. The captured information can be used to create a visual display (e.g., the network map) and/or a tabular report of network and radio performance. Types of reports may include but are not limited to;
  RSSI maps and reports
  SNR maps and reports
  Measurement static heat maps and reports (a heat map does not have individual data points but instead uses a smeared area blob to indicate data. Specific colors can be used to identify ranges for the displayed parameter.)
  Propagation versus RSSI maps and reports
  Radio metric maps and reports Maps depicting other operational parameters may also be created as known by those skilled in the art.

The health of a specific base station can also be determined from signal parameter information as collected at the network sensors. For example, assume that four receivers A, B, C, and D measure the following parameters for a single signal transmitted from a known location closest to receiver D.
  Receiver A detects the signal at −85 dB RSSI
  Receiver B detects the signal at −80 dB RSSI
  Receiver C detects the signal at −90 dB RSSI
  Receiver D detects the signal at −115 dB RSSI The location of the radio is closest to receiver D but receiver D has the lowest signal strength. Most likely there is a problem at the site of receiver D since the other three receivers see the signal at about the same strength. Using a plurality of receivers and the data from each receiver helps to determine the health of the system from logical deduction of the captured metrics.

The network receivers used for network analysis can be added to an existing network as time and funds permit. Thus the network diagnostic system can be made more robust, accurate and complete by adding receivers for receiving and analyzing uplink signals from the radios. Recall that at each location on the network map the signal parameter information is reported based on the signal as received at each base station that has an associated receiver. As additional receivers are added the signal parameter information reported at each location becomes more complete. When all base stations have an associated receiver, the diagnostic network is complete and the signal information as received at each base station (i.e., at the receiver associated with each base station) can be reported for each location on the map.

The system can also store and display:

A minimum RSSI threshold before signal parameter data is collected

A median calculation on the collected data to statistically eliminate any outliers for a radio.

Radio repair dates tied to a radio identifier (preferably a radio serial number or another unique radio identifier, such as the diagnostic identifier). A repair technician enters the radio identifier into the system before beginning the repair and a system-generated date is used as the repair date. When a repair date is entered the historical performance data and all radio transmissions are cleared A suspect radio can be cleared of all recorded performance measurements and events to restart the collection and evaluation process for the radio. The system-generated date/time is used as the "clear" date Store n previous performance data measurements for every radio Maintain lists and pertinent data that indicate the health of each radio according to the parameters that the user or system operator defines for a suspect, failed and a properly operating radio. For example, the lists can indicate a radio always transmitting signals below a user-defined RSSI threshold, above a user-defined threshold but based on fewer than n measurements, and a subjective judgment as to the radio's health (e.g., good or suspect) and the metrics on which the judgment is based. The user or system operator can also define the contents of any list and data reporting requirements for any radio.

Generate or use an operator-provided list of radio identification information that identifies radios for which performance data has not been collected Install software updates or synthetic instrumentation via an Internet connection or manually from a CD or USB drive To identify incipient network problems, the network operator can set a relatively tight tolerance for network and radio operation; any performance parameters outside this range, while not indicative of a failure, may be evidence of a potential problem. Thus parameters outside the defined range may trigger an incipient problem alert.

Although the system of the present invention has been described with reference to separate receivers that are collocated proximate a network base station, such is not necessarily required. In another embodiment the receiving devices at the base station can perform the functions of the separate receivers. Further, the receivers can analyze received signals to determine the desired signal parameters or this function can be performed by a separate device.

Although the invention has been shown and described with respect to a certain preferred embodiments, it is obvious that equivalent alterations and modifications will occur to others skilled in the art upon the reading and understanding this specification and the annexed drawing. In particular regard to the various functions performed by the above described components (assemblies, devices, circuits, etc.), the terms used to describe such components are intended to correspond, unless otherwise indicated, to any component that performs the specified function of the described component (i.e., that is functionally equivalent), even though not structurally equivalent to the disclosed structure that performs the function in the illustrated exemplary embodiments of the invention. In addition, while a particular feature of the invention may have been disclosed with respect to only one of several embodiments, such feature may be combined with one or more other features of the other embodiments as may be desired and advantageous for any given or particular application.

What is claimed is:

1. An apparatus for determining network health, the network comprising a plurality of network base station transceivers in bidirectional communication with radios operating in the network and each having an identifier for the respective radio, a first radio transmitting a transmitted signal including a first identifier, the apparatus comprising:

first and second devices each receiving the transmitted signal during normal over-the-air operation of the first radio, measuring signal parameters of the transmitted signal, and determining first and second operating characteristics of the first radio from the respective signal parameters, the first device producing a first received signal responsive to the transmitted signal when the first operating characteristics determined by the first device indicate that the first radio is healthy and the second device producing a second received signal responsive to the transmitted signal when the second operating characteristics determined by the second device indicate that the first radio is healthy, the first and second devices determining respective first and second signal parameters of the respective first and second received signals;

wherein the first received signal is time aligned with the second received signal to insure that the first and second devices have determined the respective first and second signal parameters of the same transmitted signal; and wherein the network health is indicated by the first and second operating characteristics.

2. The apparatus of claim 1 wherein the first signal is time aligned with the second signal based on a one pulse per second signal available within the network.

3. The apparatus of claim 1, further comprising a third device determining a location of the first radio and a mapping device creating a network map indicative of the network health, wherein the network map provides an indication of the first and second operating characteristics at a respective location of the first and second devices for a signal transmitted from the location of the first radio.

4. The apparatus of claim 1 wherein the first and second devices are located proximate first and second network base stations from among a plurality of network base stations.

5. The apparatus of claim 1 wherein the first and second devices each comprise a receiver.

6. The apparatus of claim 1 wherein the transmitted signal is transmitted during normal operation of the first radio without requiring interaction or manipulation of operation of the first radio.

7. The apparatus of claim 1 wherein the first radio complies with applicable radio specifications.

8. The apparatus of claim 1, further comprising n receivers and n network base station transceivers, each receiver disposed proximate an associated network base station transceiver and receiving the transmitted signal that is intended for the associated network base station transceiver, each one of the n receivers or the associated network base station transceivers measuring signal parameters of the transmitted signal and determining nth operating characteristics of the first radio from the respective signal parameters for the signal received at the nth receiver.

9. The apparatus of claim 1, wherein:

the first radio comprises a mobile radio having a plurality of different locations at different times, wherein for each one of the different locations, the first device determines a set of first operating characteristics for each signal received at the first device responsive to the transmitted signal, a number of sets of the first operating characteristics being signal parameters equal to the number of different locations;

wherein for each one of the different locations, the second device determines a set of second operating characteristics for each signal received at the second device responsive to the transmitted signal, a number of sets of the second operating characteristics being signal parameters equal to the number of different locations; and wherein the network health is responsive to the sets of first operating characteristics and the sets of second operating characteristics.

10. The apparatus of claim 1, further comprising a third device for creating a report indicating the first and second operating characteristics at a location of the first radio, wherein the network health at the location is responsive to the first and second operating characteristics.

11. The apparatus of claim 1, wherein the first and second operating characteristics each comprise one or more of RSSI, SNR, signal strength, RF frequency accuracy, RF frequency offset from an assigned frequency, timing of RF frequency offsets relative to a beginning of a message transmission, RF frequency offset variations throughout a message transmission, frequency deviation of the modulated signal, range of frequency deviations over time, amplitude variations during a message transmission, symbol frequency error, symbol clock error, modulation fidelity, bit error rate, conformance to packet structure specifications, baud rate changes during a message transmission, spurious emissions, consistent low power level irrespective of location of the transmitting device, high bit error rate irrespective of location of the transmitting device, battery charge, and a number of retries over a predetermined threshold.

12. The apparatus of claim 1 wherein the network comprises a trunked radio network.

13. The apparatus of claim 1, wherein the first and second devices determine the first and second operating characteristics in real-time as the transmitted signal is received or store the transmitted signal and later determine determining the first and second operating characteristics.

14. The device according to claim 1, wherein at least one of the first and second devices time-aligns the first received signal with the second received signal.

15. The device according to claim 1, further comprising a controller performing the time alignment of the first received signal with the second received signal.

16. An apparatus for determining network health, the network comprising base station transceivers in bidirectional communication with radios operational in the network and each having an identifier for the respective radio, a first radio operable to transmit a transmitted signal including a first identifier from a first location during normal operation of the first radio, the apparatus comprising:

n signal receivers to be placed proximate each one of n base station transceivers within the network, each one of the n signal receivers:
measuring signal parameters of the transmitted signal;
determining operating characteristics of the first radio from the respective signal parameters; and
producing an nth received signal responsive to the transmitted signal;

a first device determining, for each of the operating characteristics indicating a respective transmitting radio is healthy, n sets of operating characteristics, signal parameters one set for each received signal;

wherein n received signals are time aligned to ensure for the purpose of ensuring that the first device determines the n sets of operating characteristics signal parameters of the same transmitted signal; and wherein the network health is indicated by the n sets of operating characteristics.

17. The apparatus of claim 16 wherein the first radio comprises a radio operating in compliance with applicable radio specifications.

18. The apparatus of claim 16 wherein the first device further determines whether the signal received at each receiver is compliant with applicable packet and signal specifications.

19. The apparatus of claim 16, wherein the first radio comprises a mobile radio operable at a plurality of different locations at different times, wherein, for each one of the different locations, the first device determines a set of operating characteristics of a received signal received at each signal receiver.

20. The apparatus of claim 16, further comprising a second device determining a location of the first radio and a mapping device creating a network map showing the n sets of operating characteristics at the location of the first radio on the map, where the network health at the location of the first radio on the map is responsive to the n sets of operating characteristics.

21. A method for determining network health, the network comprising a plurality of base station transceivers in bidirectional communication with a plurality of radios operating in the network each having a respective radio identifier, a first radio from the plurality of radios transmitting a transmitted signal including a first radio identifier during normal operation of the first radio, the method comprising receiving the transmitted signal at a first receiver proximate a first base station and at a second receiver proximate a second base station;

measuring signal parameters of the transmitted signal with each of the first and second receivers;

determining first and second operating characteristics responsive to, respectively, the transmitted signal as received at the first receiver and the transmitted signal as received at the second receiver;

time aligning the first and second received signals to ensure that the first and second operating characteristics have been determined for the transmitted signal as received at the first receiver and as received at the second receiver; and determining network health responsive to the first and second operating characteristics.

22. The method of claim 21, wherein the first radio comprises a mobile radio, and wherein as the mobile radio traverses a coverage area of the network, transmitted signals are transmitted from the first radio and from different locations of the coverage area, the method further comprising:

for each one of the signals transmitted from different locations, determining first and second operating characteristics responsive to, respectively, the transmitted signal as received at the first receiver and the transmitted signal as received at the second receiver; and determining network health at each one of the different locations responsive to the first and second operating characteristics further responsive to the transmitted signal as received at the first receiver and the transmitted signal as received at the second receiver, the transmitted signal transmitted from different locations of the first radio.

* * * * *

UNITED STATES PATENT AND TRADEMARK OFFICE
CERTIFICATE OF CORRECTION

Page 1 of 1

PATENT NO. : 8,825,042 B2
APPLICATION NO. : 13/106833
DATED : September 2, 2014
INVENTOR(S) : John McCarthy and Robert Mitchell It is certified that error appears in the above-identified patent and that said Letters Patent is hereby corrected as shown below:

On the title page, item [73], line 9 of the "Assignee" section, replace "Lows" with --Locus--

In the specification:
In column 4, line 52, after "There" add --are--
In column 6, line 12, after "receiver" add --and--
In column 7, line 56, replace "drawing" with --drawings--
In column 8, line 64, after "wherein" add --,--
In column 9, line 4, after "wherein" add --,--
In column 9, line 39, delete "determining"
In column 9, line 64, delete "signal param"
In column 9, line 65, delete "eters"
In column 10, line 1, delete "for"
In column 10, line 2, delete "the purpose of ensuring"
In column 10, line 3, delete "signal parameters"
In column 10, line 50, after "wherein" add --,--

Signed and Sealed this
Thirteenth Day of October, 2015

Michelle K. Lee
*Director of the United States Patent and Trademark Office*